United States Patent
August

(10) Patent No.: US 8,191,955 B2
(45) Date of Patent: Jun. 5, 2012

(54) BASE DRAG REDUCTION FOR ROAD VEHICLES AND 'AIRDROP' CARGO AIRCRAFT

(76) Inventor: Henry August, Chatsworth, CA (US)

(*) Notice: Subject to any disclaimer, the term of this patent is extended or adjusted under 35 U.S.C. 154(b) by 0 days.

(21) Appl. No.: 12/914,155

(22) Filed: Oct. 28, 2010

(65) Prior Publication Data
US 2012/0104794 A1    May 3, 2012

(51) Int. Cl.
*B62D 35/00* (2006.01)
(52) U.S. Cl. .............. 296/180.1; 296/181.5; 296/1.11; 293/113; 359/872
(58) Field of Classification Search .............. 296/180.1, 296/180.4, 181.5, 1.11; 244/123.11, 130; 293/113; 359/872
See application file for complete search history.

(56) References Cited

U.S. PATENT DOCUMENTS

| | | | | |
|---|---|---|---|---|
| 2,737,411 A * | 3/1956 | Potter | ............... | 296/180.4 |
| 4,441,751 A * | 4/1984 | Wesley | ............... | 296/180.1 |
| 4,460,055 A * | 7/1984 | Steiner | ............... | 180/7.1 |
| 4,538,851 A * | 9/1985 | Taylor | ............... | 296/180.1 |
| 4,601,508 A * | 7/1986 | Kerian | ............... | 296/180.4 |
| 4,898,458 A * | 2/1990 | McDonald | ............... | 359/509 |
| 4,978,162 A * | 12/1990 | Labbe | ............... | 296/180.2 |
| 5,903,389 A * | 5/1999 | Rumez et al. | ............... | 359/509 |
| 6,290,361 B1 * | 9/2001 | Berzin | ............... | 359/507 |
| 6,386,712 B1 * | 5/2002 | Warner | ............... | 359/507 |
| 6,685,256 B1 * | 2/2004 | Shermer | ............... | 296/180.4 |
| 2008/0309121 A1 * | 12/2008 | Campbell | ............... | 296/180.1 |
| 2009/0212598 A1 * | 8/2009 | Otterstrom | ............... | 296/181.5 |

* cited by examiner

Primary Examiner — Jason S Morrow

(57) ABSTRACT

Methods of and devices for providing naturally driven routing of air bleed derived from the external air pressure field typically developed about a moving vehicle were conceived. By design, internal duct ways to be used for providing an open flow path from relatively higher air pressure sources (such as that in the undercarriage region of a driven car) into lower base pressure regions (typically developed aft of blunt trailing body regions) as are generally found on road and 'airdrop" cargo delivery air vehicles having open rear doors. Low energy air bleed flow injected into the vehicle's separated afterbody region acts to replenish entrained base flow and its base drag reduction is thereby, achieved.

1 Claim, 8 Drawing Sheets

BASE DRAG REDUCTION FOR ROAD VEHICLES AND 'AIRDROP' CARGO AIRCRAFT

BACKGROUND OF THE INVENTION

Due to the lack of adequate supplies of refined hydrocarbon fuels relative to increasing global demand and high usage of hydrocarbon fuels, the cost of gasoline for the powering of typical road cars and trucks has escalated. Higher fuel costs are driven by foreign nations that control the global rates of oil production. In addition, domestic oil refineries have been limited in their production capacity by damage to these facilities inflicted hurricane. Also, politically driven global markets are often controlled by constrained foreign oil supplies so that higher costs of hydrocarbon fuels can be derived. Consequently, road and air travel in the USA is largely being self-curtailed to special needs and shortened trips so that the costs of travel can be constrained. By limiting normal mileage usage, drivers and fliers are striving to realize savings in their fuel costs. Accordingly, significant reductions in merchant sales and lesser profits are being imposed upon our roadside businesses. Further, added transportation expenses due to higher fuel costs necessary for rapid interstate trucking transportation as well as shorter road deliveries of their goods are causing many small businesses to hesitate in their plans to avail new job opportunities to our national work force. This disruption in car and aircraft usage is being felt across our nation and these factors act to weaken the growth of our national economy.

The rate of fuel consumption used by a standard car, truck or aircraft can be alleviated by introducing unique air injection approaches to vehicle afterbody designs.

In particular, a typical prior art notch-backed car suffers high base drag contributions in two local regions; namely, its separated afterbody base flow regions (see FIG. 1) and that of its externally side-mounted, blunt based rearview mirrors (both left and right hand units, see FIG. 3). In FIG. 1, unsteady L-shaped vortex 1 and arch-vortex formations 2 are shown. Separated flow 3 from the roof is also shown with trailing vortices 4.

BRIEF SUMMARY OF THE INVENTION

Methods of and devices for providing naturally driven (unpowered) routing of air bleed flow from higher pressure air sources (the undercarriage region of a car) into lower base pressure regions of separated base flow (thereby reducing its base drag) are conceived herein.

DETAILED DESCRIPTION OF THE INVENTION

The use of self-injection techniques that deliver low energy air bleed into the separated base flow of a traveling car's blunt afterbody (FIG. 2) can be used to raise its base pressure and realize significant base drag reduction. Thus, total drag reduction to the vehicle can be achieved. Lateral air bleeds on the rear window 5 and upward air bleeds from slots in the bumper 6 are provided. The air bleed are self-driven flowing from higher to lower pressure regions. Specifically, the air bleeds can be routed from undercarriage regions of the vehicle and thus the base pressure is increased due to the injected air bleeds.

Figure 1:
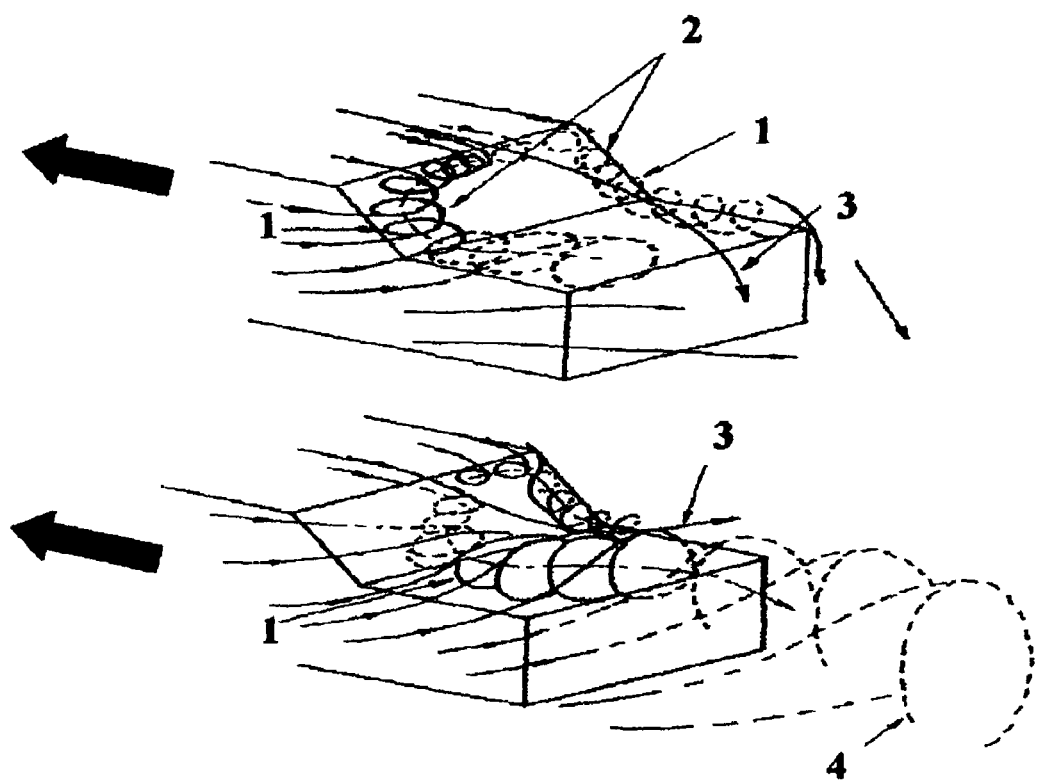
FIG. 1—High base drag on a typical road vehicle due to afterbody flow separation. Unsteady vortex shedding formations are shown.
Figure 2:
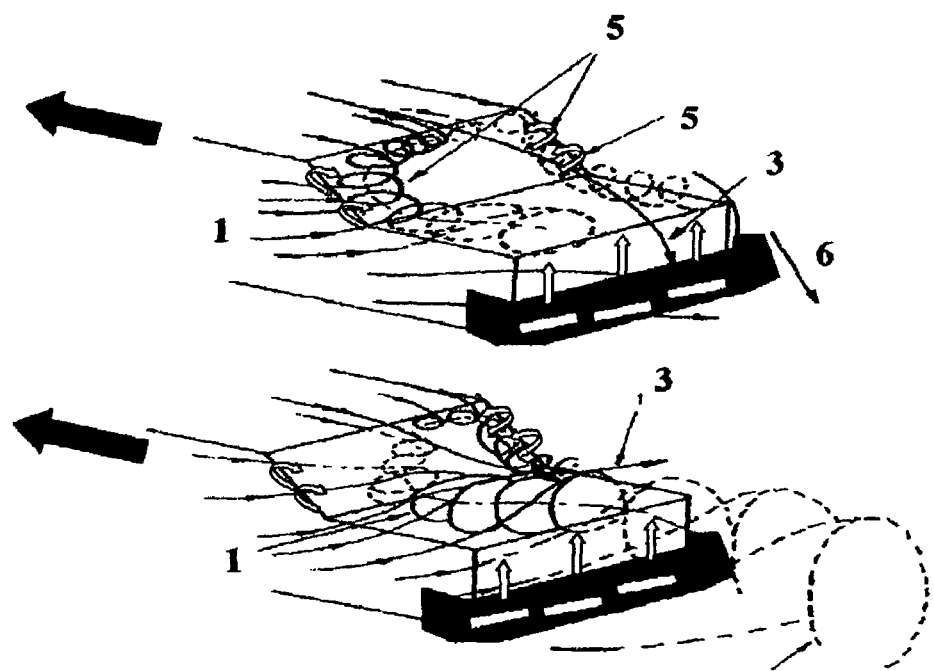
FIG. 2—Base drag reduction for road vehicles can be achieved due to injection of air bleed that is distributed into separated afterbody flow regions.
Figure 3:
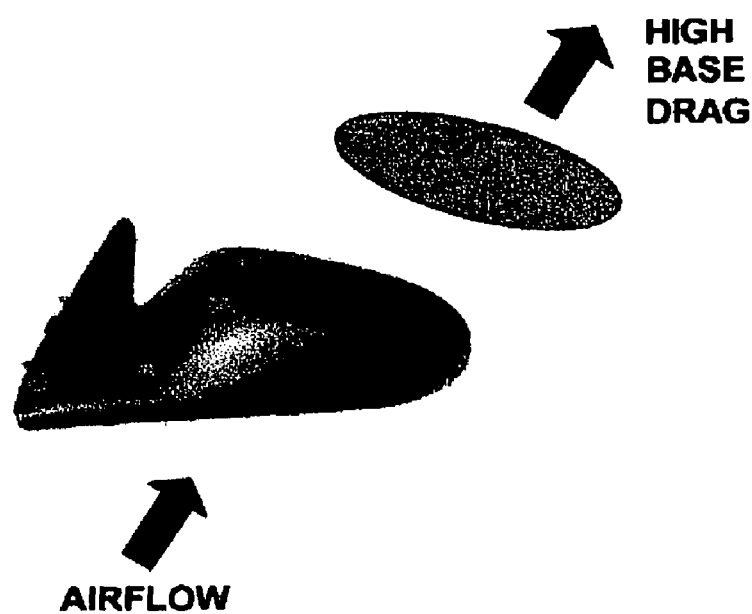
FIG. 3—A typical side-mounted rearview mirror for a car is depicted.

This self-injection air bleed technique raises the base pressure of these regions and thereby achieves significant base drag reduction to a traveling car's blunt afterbody (FIG. 2).

Figure 4:
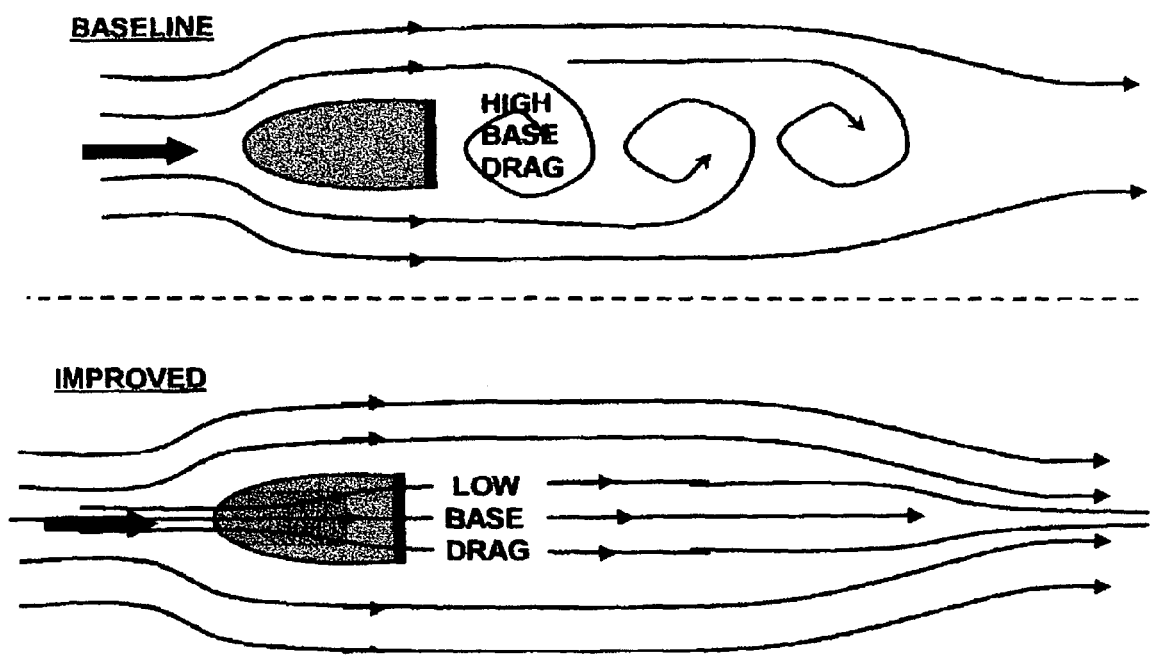
FIG. 4—Base drag reduction technique using air bleed injection on a side-mounted flow through rearview mirror of a car is shown.
Figure 5:
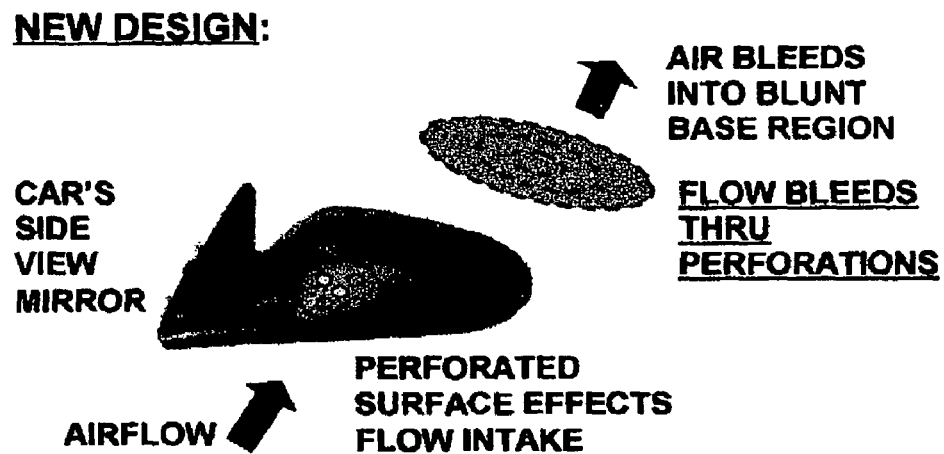
FIG. 5—Sketch of a new design concept for achieving base drag reduction of a road vehicle's rearview mirror is shown.

A flow through method (see FIGS. 4 and 5) is used to similarly effect a significant base drag reduction to externally mounted, blunt based side view mirrors that are mounted (left and right hand devices) on a moving car. A flow through perforated skin, baffles, and a slit mirror create a low base drag. To maintain the flow through of air during adverse weather conditions (rain, sleet, or snow), an internal heating device will be included.

The air bleed into the mirror's base region is naturally driven from the external stream (FIG. 5) and acts to replenish the entrained base flow, thereby raising its base pressure. During adverse weather conditions (rain, sleet or snow), a self-activated internal heating device will be used to maintain flow through of air to the base of the mirrored surface.

This flow through technique can effect significant base drag reduction to the blunt side view mirror's housing on a traveling road vehicle. This channeling approach provides self-injection, low energy air bleed that penetrates through perforated slits of mirrored glass (retaining the display of rearview scenes to the driver; see FIG. 5) and bleeds air into the base flow of the side mirrors on a road vehicle. In this manner, significant base drag reduction to the blunt based housing of these external rearview mirrors can be realized.

Military and Rescue Missions Performed by Cargo 'Airdrop' Aircraft

Figure 6:
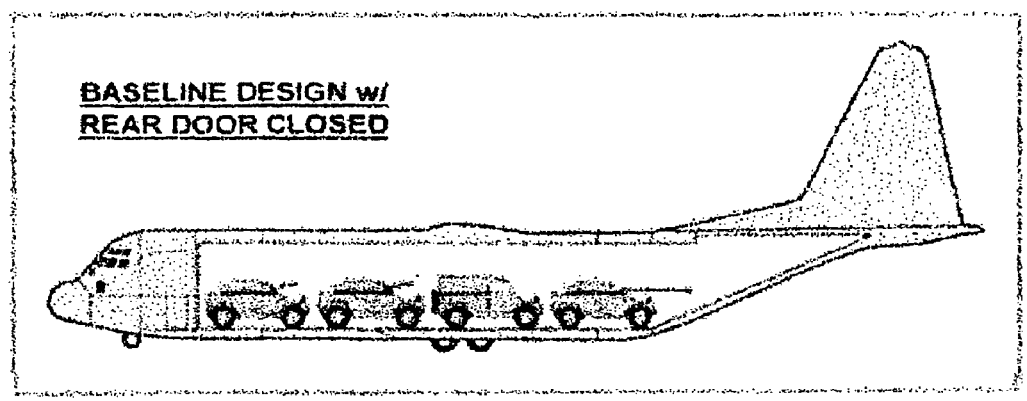
FIG. 6—Sketch of a C-130 cargo delivery aircraft is shown with its typical load of heavy tanks, trucks and manned paratroops that can be launched in flight by 'airdrop' techniques from the open rear door of the aircraft.

In times of war as well as good will, the C-130 aircraft (see FIG. 6) is called on by our armed forces for airlifts thereby providing necessary and urgent ground and airborne delivery of large cargo items (tanks, trucks and electronic equipment).

Figure 7:
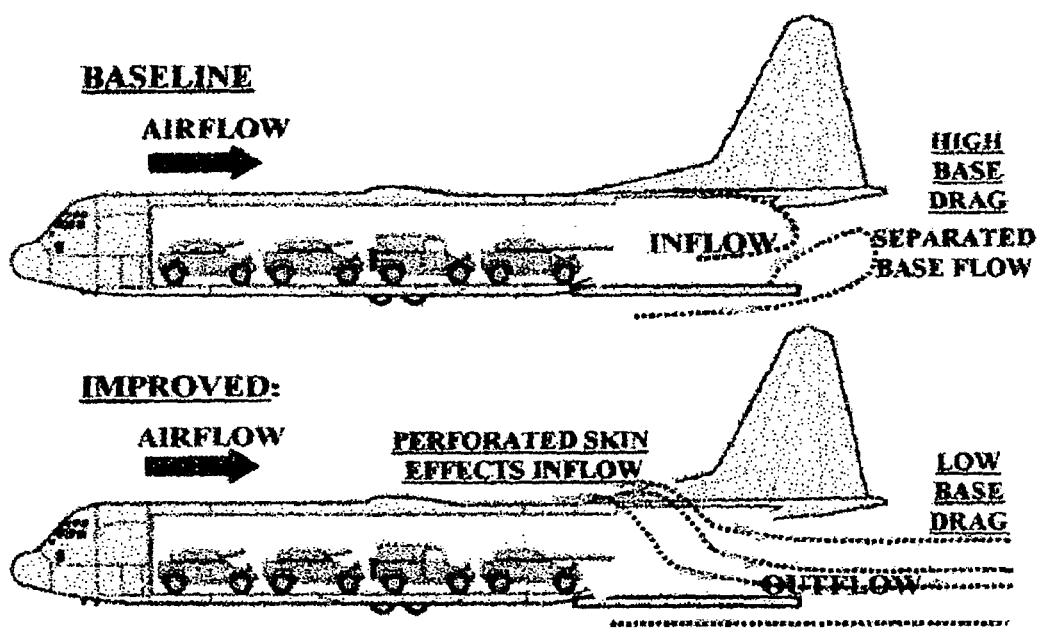
FIG. 7—With its rear door open during the 'airdrop' launching of heavy equipment and men from the C-130 aircraft, its separated base flow causes very high base drag to the aircraft as well as invokes precarious launching conditions due to its shedding of unsteady vortices. By allowing airflow entry through the upper aft fuselage region of the aircraft, air bleed is feed into the lower pressure of its base flow region. Accordingly, this influx of air reduces the vehicle's base drag and alleviates its vortex shedding.
Figure 8:
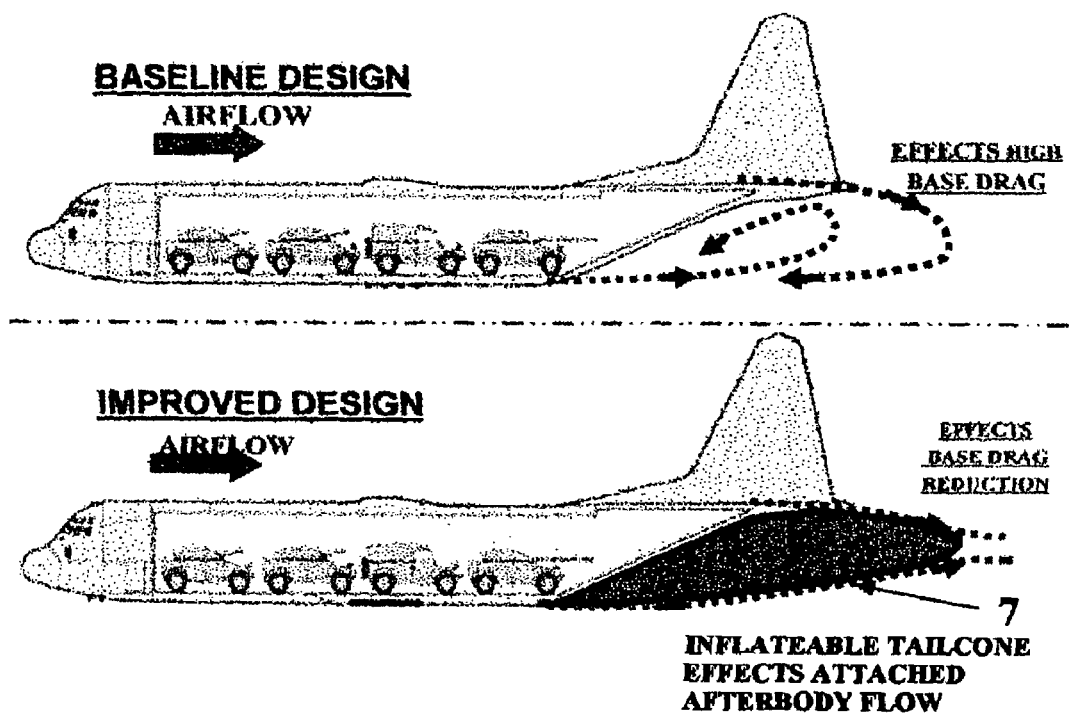
FIG. 8—With its rear door closed during normal flight of the C-130 aircraft, boundary layer flow along the lower rear door separates due to its too large turning angle and this condition invokes high base drag to the vehicle. By fitting the aircraft with a pump-driven inflatable airbag that is shaped as a slender afterbody tail cone, the lower boundary layer flow remains attached and the vehicle's base drag is largely reduced.

In addition, many such missions require that teams of highly trained personnel be delivered to specific global locations via parachute 'airdrops'. To increase the flight performance of these special type aircraft (airspeed, range and the 'safe' delivery of airborne troops along with their heavy equipment), unique base drag reduction techniques for the C-130 aircraft during periods of flight for accommodating airborne delivery (base door open; see FIG. 7) are used. Perforated skin effects an inflow and outflow that creates a low base drag. During its periods of normal flight (base door closed; see FIG. 8), a slender tail cone 7 can be developed and formed via an inflatable air bag that can be attached to the vehicle's rear door (see FIG. 8 and Reference). Note that the C-17 and C-5 aircraft are similar in function and overall design to that of the C-130 aircraft. Both these approaches for base drag reduction are unique and were independently conceived.

The invention claimed is:

1. A road vehicle having reduced base drag features comprising:
   a vehicle body having a front, a rear, a left side, and a right side; said vehicle including afterbody regions and a rear window;
   a left side rearview mirror housing and a right side rearview mirror housing, each mirror housing having a perforated front skin, baffles, and a mirror with slits allowing air to flow through the mirror housing when the vehicle moves forward in order to reduce the drag contribution of said mirrors to the vehicle;
   side regions on left side and right side of the vehicle adjacent to the rear window including self-driven air bleeds utilizing higher air pressure channeled from an underside of the vehicle to lower air pressure regions at the rear of the vehicle to achieve a drag reduction to the afterbody regions; and
   a bumper at the rear of the vehicle, the bumper including upward facing slots which are self-driven air bleeds utilizing higher air pressure channeled from an underside of the vehicle to lower pressure air regions at the rear of the vehicle to achieve a drag reduction to the afterbody regions.

\* \* \* \* \*